July 7, 1959

W. J. MONTGOMERY 2,893,852

FIXED BED REFORMER VAPOR DISTRIBUTOR

Filed April 16, 1956

INVENTOR.
William J. Montgomery

BY

Michael Dufresne
ATTORNEY

United States Patent Office 2,893,852
Patented July 7, 1959

2,893,852
FIXED BED REFORMER VAPOR DISTRIBUTOR

William J. Montgomery, Texas City, Tex., assignor to The American Oil Company, Texas City, Tex., a corporation of Texas Application April 16, 1956, Serial No. 578,306

2 Claims. (Cl. 23—288)

This invention relates to a distributor means adapted for use on the vapor inlet conduit in downflow fixed bed catalytic reformers. Also, the invention relates to a downflow fixed bed catalytic reformer reactor.

In catalytic reforming, the hydrocarbon feed and associated hydrogen and other recycled gases are usually introduced into a reactor containing a fixed bed of catalyst and usually the flow of vapor, etc. is down through the catalyst bed with the conversion products exiting from the lower end of the reactor. Catalytic reforming is usually carried out at pressures of several hundred pounds. The stream of vapor entering the reactor at this pressure and high velocity causes considerable displacement of the catalyst bed. The prior art baffles introduced between the inlet conduit and the bed have not prevented displacement of the bed to such a degree that operation of the reformer has not been interfered with.

An object of the invention is a vapor distributor means for use in downflow fixed bed reformer reactors. Another object is a distributor means which greatly reduces the displacement of the surface of the bed of catalyst in downflow fixed bed catalytic reformer reactors. A particular object is a simple economical distributor means for reducing the velocity of inlet vapors into the top of a fixed bed catalytic reformer reactor, thereby reducing displacement of the catalyst bed. Still another object is a catalytic reformer reactor adapted for downflow operation provided with a distributor means which reduces bed displacement. Other objects will become apparent in the course of the detailed description.

Figure 5:
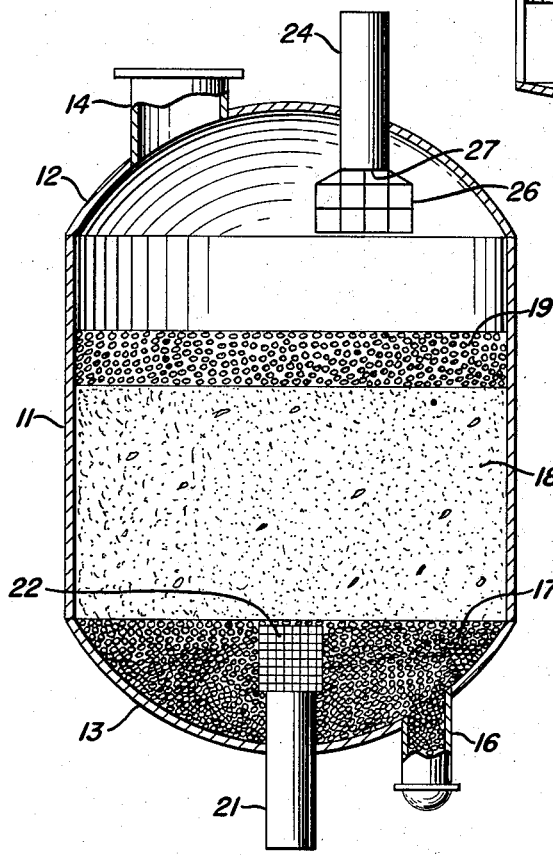
Figure 5 shows one form of a downflow fixed bed catalytic reactor utilizing the distributor means of Figure 1.

The invention is described in connection with the annexed figures which set out one particular form of the distributor means of the invention. In Figure 5, there is shown a typical reactor for use in a fixed bed downflow catalytic refining operation. This type of reactor may be used for a straight catalytic cracking operation but is more particularly used for reforming of naphthas in the presence of hydrogen. In Figure 5, the reactor comprises a substantially cylindrical vessel 11 provided with an upper end-closure 12 and a lower end-closure 13. The reactor is positioned vertically and the axis of the cylindrical portion 11 is substantially vertical. A means 14 is provided in the upper end-closure for loading of catalyst, etc. into the vessel and entry of men for maintenance. A means 16 is provided in lower-end-closure 13 for withdrawal of material from the interior of the vessel. In this embodiment, an amount of alumina spheres 17 has been positioned in the bottom of the vessel to a point rising to about the lowermost point of the cylindrical portion of the vessel. These alumina spheres 17 provide a base for the catalyst bed 18. The catalyst bed may be particles or pellets or spheres. In a catalytic reforming operation, the catalyst may be platinum supported on alumina or molybdenum oxide supported on alumina. A layer of alumina spheres 19 is positioned on top of the catalyst bed 18. This bed aids in reducing displacement of the catalyst bed itself and also keeps solid materials introduced along with the vapor feed from direct contact with the catalyst.

Conversion products are removed from within the reactor by way of vapor outlet conduit 21 which is positioned in lower end-closure 13. Vapor outlet conduit 21 extends into the lower bed of alumina spheres 17 and is provided with a screen 22. An inlet vapor conduit 24 is positioned in upper end-closure 12. Inlet vapor conduit 24 is positioned so that it is substantially perpendicular to the catalyst bed 18, i.e., the axis of the inlet vapor conduit is substantially parallel to the axis of the cylindrical portion of vessel 11.

A vapor distributor means 26 is affixed to the vessel-end 27 of inlet vapor conduit 24 and below the inlet vapor conduit. Distributor means 26 forces the vapors and gases entering vessel 11 from inlet vapor conduit 24 to change direction 90 degrees and controls the reduction in velocity of the vapors as they pass out of the conduit into the enlarged space provided by the reactor interior.

Figure 4:
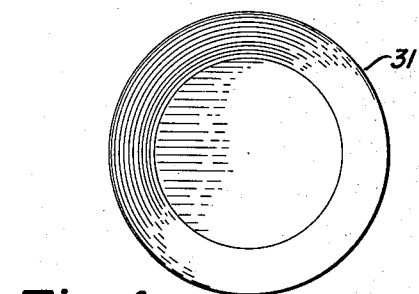
Figure 4 shows the bottom baffle plate utilized in Figure 1.
Figure 1:
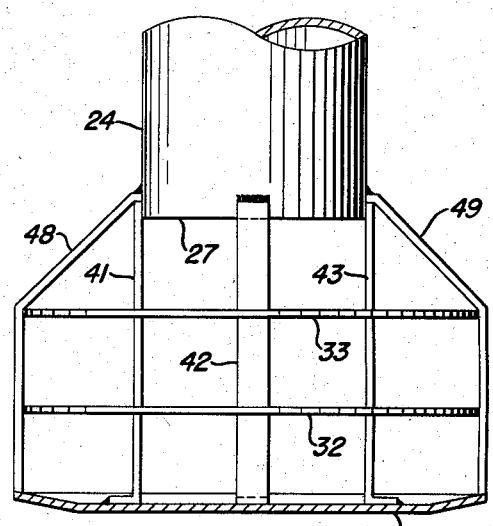
Figure 1 shows a plan view of one embodiment of the distributor means of the invention attached to the end of the vapor inlet conduit.

Figure 1 shows one embodiment of the distributor means wherein three substantially circular plates 31, 32, and 33 are utilized. Plates 31, 32 and 33 are in vertical spaced relationship. The particular spacing is dependent upon the conditions of the particular catalytic reforming operation and the type of equipment being used. To illustrate, the pressure differential between the material in inlet vapor conduit 24 and the interior of the reactor, the difference in internal diameter of conduit 24 and the cylindrical portion 11 of the reactor and the vapor space above the top of the alumina ball layer 19. In general, the vertical spacing between the vessel-end 27 of inlet conduit 24 and the uppermost plate 33 and that between each of the plates respectively, will be between about 0.4 and 1 times the internal diameter of said inlet conduit. It is to be understood that this stated relationship of the vertical spacing between the plates and between the uppermost plate and the vessel-end of the inlet conduit may be appreciably less or more than that stated because of the particular circumstances of the individual operation.

The baffle plates 31, 32, and 33 are of substantially equal diameter and they are positioned below the inlet conduit 24 so that the axis of the plates is substantially co-incident with the axis of inlet conduit 24, that is, when the axis of inlet conduit 24 is extended down into the reactor. The bottom plate 31 is imperforate, i.e., is a solid plate without any openings. In this particular embodiment, plate 31 is somewhat dish-shaped in order to increase its structural strength.

Figure 2:
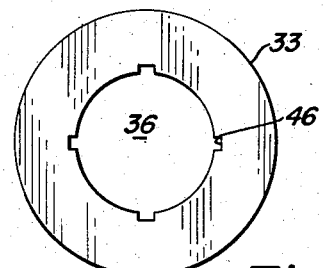
Figure 2 shows the upper ring baffle utilized in Figure 1.
Figure 3:
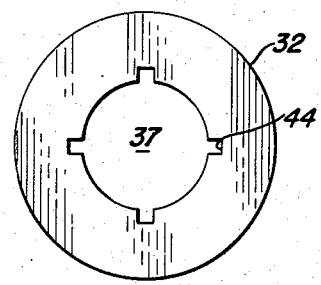
Figure 3 shows the lower ring baffle utilized in Figure 1.

The other baffle plates in the distributor means, herein plates 32 and 33, are provided with a substantially centrally located aperture. This aperture may be a single circular opening such as is shown in Figures 2 and 3 or it may be a number of smaller openings or perforations arranged as a group about the central portion of the apertured plates. The total area of the individual perforations in an apertured plate will be about the same as the area of a single opening such as is shown in plates 32 and 33.

The area of the inlet conduit 24 and the area of the apertures in the apertured plates of the distributor means has a relationship. The relationship between the cross-sectional area of the vessel-end of inlet conduit 24 to the aperture area in the uppermost apertured plate 33 herein is between about 1.2 and 1.55. The aperture area in each apertured plate decreases as the particular apertured plate is positioned farther and farther from the vessel-end of the inlet conduit. To illustrate, the apertured area of plate 32 is less than that of plate 33. The relationship between the apertured area of an apertured plate and the aperture area of the apertured plate immediately below this plate is between about 1.3 and 1.7.

When a single circular opening is utilized in each of the apertured plates, the relationship between the cross-sectional area of the vessel-end of inlet conduit and the apertured area of the uppermost plate and also the relationship between the apertured areas of the individual plates may be placed on a diameter basis. Thus the ratio of the internal diameter of the vessel-end of inlet conduit 24 to the diameter of the opening 36 in ring baffle 33 is between about 1.1 and 1.25. The ratio of the diameter of opening 36 and ring baffle 33 and the diameter of opening 37 and ring baffle 32 is between about 1.15 and 1.3.

In addition to the foregoing relationships, the diameter of the plates 31, 32 and 33 respectively, is such that the ratio of this plate diameter to the internal diameter of the vessel-end 27 of inlet conduit 24 is between about 2 and 2.5.

In Figure 1, the plates 31, 32 and 33 are maintained in vertical spaced relationship by means of straps 41, 42 and 43. These straps 41, etc. are welded to the upper side of solid baffle 31 and to baffles 32 and 33. Baffle 32 is provided with four slots 44 and baffle 33 is provided with four slots 46. These slots are of such a depth that straps 41, 42 and 43 and one strap not shown may be welded to vessel-end 27 of conduit 24 without bending the straps.

The distributor means is strengthened by the use of straps 48 and 49 and 2 other straps not shown which pass from plate 31 up the outside edge of plates 32 and 33 and are bent over to be affixed to the outside of conduit 24.

It is to be understood that more than two apertured plates may be used and other means of maintaining these plates in spaced vertical relationship and positioning the plates at and below the vessel-end of the inlet conduit may be readily devised and are intended to be included within the scope of the claimed invention.

In one embodiment, the internal diameter of the cylindrical portion 11 of the reactor was 12 feet with a height of the cylindrical portion of 9 feet. The end-closure 13 was filled with alumina balls to the tangent line of the cylindrical portion. The catalyst bed was composed of pellets one-eighth inch size having a bulk density of 50 pounds per cubic foot. On top of the catalyst bed, about 14 inches of alumina balls were positioned, the alumina balls having a bulk density of 115 pounds per cubic foot. The vessel-end 27 of inlet vapor conduit 24 was 13 inches in internal diameter and the distributor means were fastened to the vessel-end of inlet conduit 24 and below so that the bottom plate was about at the upper tangent line of end-closure 12.

Distributor means 26 consisted of 3 plates as shown in Figures 1 through 4. Plate 31 was 29 inches in outside diameter and was slightly dish-shaped. Plates 32 and 33 were also about 29 inches in outside diameter. Plate 32 was provided with a circular hole 9 inches in diameter and 4 slots. The distance from the end of one slot to the end of the diametrically opposed slot was 15 inches. Plate 33 was provided with a circular opening 11 inches in diameter and 4 slots in that opening having a span of 15 inches.

Plates 31, 32 and 33 were spaced vertically by means of straps 41, 42 and 43, etc. with the distance from plate 31 to plate 32 being 6 inches and from 32 to plate 33 being 6 inches. The plates were then mounted at the vessel-end of inlet conduit 24 so that the distance between vessel-end 27 of inlet conduit 24 and the top of plate 33 was 6 inches.

When the assembly as described above was used in a catalytic reforming operation, after about 3 months of operation, the reactor was opened and it was found that there was substantially no displacement of the alumina balls 19 and that the pressure drop at full charge rate was only 15 pounds through the reactor.

In a previous operation, wherein a single solid plate 18 inches in diameter was positioned about 18 inches below vessel-end 27 of inlet conduit 24 and this plate used as a distributor, it was necessary to shut down after only 56 hours on stream. The pressure drop at two-thirds of the design charge rate was 22 pounds per square inch. Examination of the reactor showed that the alumina balls had been considerably displaced and catalyst pellets from the catalyst bed 18 had become well mixed with the load of alumina balls 19.

Operation shows that the distributor means as described herein essentially overcomes the problem of displacement of the fixed bed of material in the reactor below the inlet conduit and permits design operation for prolonged periods of time with a minimum pressure drop due to catalyst bed displacement.

Thus having described the invention, what is claimed is:

1. A reactor for use in downflow fixed bed catalytic reforming, which reactor comprises a substantially cylindrical vessel provided with end-closures, the axis of the cylindrical portion being substantially vertical, an inlet vapor conduit of substantially circular cross section positioned in said upper end-closure, the axis of said inlet conduit being substantially parallel to the axis of said vessel, an outlet vapor conduit positioned in said lower end-closure, a distributor means positioned at and below the vessel-end of said inlet conduit, said distributor means comprising at least three substantially circular plates in vertical spaced relationship, the axis of said plates being substantially co-incident with the axis of said inlet conduit, said plates being of substantially equal diameter, the relationship of said plate diameter to the internal diameter of said inlet conduit being between about 2 and 2.5, the lowermost plate being imperforate, the other plates being provided, respectively, with a substantially centrally located aperture, the relationship between the cross-sectional area of said inlet conduit to the aperture area in the plate immediately adjacent the vessel-end of said inlet conduit being between about 1.2 and 1.55 and the aperture area decreasing as the aperture plate is positioned farther from the vessel-end of said inlet conduit, the relationship between the aperture area of one apertured plate and the aperture area of the apertured plate immediately below being between about 1.3 and 1.7 and means for positioning said plates at and below a vessel-end of an inlet conduit and lowermost plate in spaced vertical relation to the top of a fixed bed of solid particles positioned within said vessel.

2. The reactor of claim 1 wherein said distributor means comprises three plates, the uppermost plate and the intermediate plate being provided with circular openings positioned below the vessel-end of said inlet conduit, the relationship between the internal diameter of said inlet conduit and the diameter of the opening in the uppermost plate being between about 1.1 and 1.25 and the relationship between the diameter of the opening in the uppermost plate and the diameter of the opening in the intermediate plate being between about 1.15 and 1.3 and the vertical spacing between the vessel-end of the inlet conduit and each of said plates, respectively, being about 0.4 and 1 times the internal diameter of said inlet conduit.

References Cited in the file of this patent

UNITED STATES PATENTS

| | | |
|---|---|---|
| 1,877,046 | Phillips | Sept. 13, 1932 |
| 1,950,285 | Battle | Mar. 6, 1934 |
| 2,399,560 | Murphree | Apr. 30, 1946 |
| 2,559,876 | Hoekstra | July 10, 1951 |
| 2,635,989 | Bonner | Apr. 21, 1953 |
| 2,657,121 | Rollins | Oct. 27, 1953 |

FOREIGN PATENTS

| | | |
|---|---|---|
| 492,731 | France | Apr. 1, 1919 |